United States Patent
Howell et al.

(10) Patent No.: US 7,363,131 B2
(45) Date of Patent: Apr. 22, 2008

(54) RE-POSITIONABLE VEHICLE CONTROL-BY-WIRE ASSEMBLY, METHOD, AND SYSTEM

(75) Inventors: Gregory Howell, Shelby, MI (US); Stephen T Lim, Farmington Hills, MI (US); Stuart P Macey, Carlsbad, CA (US)

(73) Assignee: Chrysler LLC, Auburn Hills, MI (US)

( * ) Notice: Subject to any disclaimer, the term of this patent is extended or adjusted under 35 U.S.C. 154(b) by 736 days.

(21) Appl. No.: 10/869,304

(22) Filed: Jun. 16, 2004

(65) Prior Publication Data
US 2005/0283288 A1    Dec. 22, 2005

(51) Int. Cl.
*B60W 10/10*   (2006.01)
*B62D 1/00*    (2006.01)
*G06F 17/00*   (2006.01)

(52) U.S. Cl. .............. 701/41; 701/1; 701/43; 701/50; 180/334; 280/752

(58) Field of Classification Search .......... 701/41, 701/42, 150; 180/334, 326, 78; 280/752, 280/777; 192/220.2
See application file for complete search history.

(56) References Cited

U.S. PATENT DOCUMENTS

| | | | | |
|---|---|---|---|---|
| 3,737,003 A | * | 6/1973 | Beals et al. | 180/78 |
| 5,617,929 A | * | 4/1997 | Richardson et al. | 180/326 |
| 6,857,498 B2 | * | 2/2005 | Vitale et al. | 180/326 |
| 7,128,342 B2 | * | 10/2006 | Davis et al. | 280/777 |
| 7,137,499 B2 | * | 11/2006 | Riefe et al. | 192/220.2 |
| 7,185,918 B2 | * | 3/2007 | Riefe et al. | 280/777 |
| 7,213,673 B2 | * | 5/2007 | Shabana et al. | 180/334 |

* cited by examiner

*Primary Examiner*—Tan Q. Nguyen
(74) *Attorney, Agent, or Firm*—Ralph E. Smith

(57) ABSTRACT

A vehicle control assembly and a method and system for controlling a vehicle. The assembly includes a controller. A steer-by-wire component, a brake-by-wire component, and an accelerator-by-wire component are each operably attached to the controller. A track is operably attached to the vehicle. The controller is laterally re-positionable with respect to the track. The method includes the steps of providing a controller, and steering, braking, and accelerating the vehicle by-wire with the controller. The method further includes the step of re-positioning the controller between a first vehicle side to a second vehicle side. The system includes controller means, and means for steering, braking, and accelerating the vehicle by-wire with the controller means. The system further includes means for reversibly positioning the controller means from a first vehicle side to a second vehicle side.

20 Claims, 7 Drawing Sheets

RE-POSITIONABLE VEHICLE CONTROL-BY-WIRE ASSEMBLY, METHOD, AND SYSTEM

TECHNICAL FIELD OF THE INVENTION

The present invention relates generally to vehicular control systems. More particularly, the invention relates to a re-positionable vehicle control-by-wire assembly, method, and system.

BACKGROUND OF THE INVENTION

Conventional vehicle control systems (e.g., steering, brake, accelerator, etc.) typically include an input assembly (e.g., steering wheel, brake pedal, accelerator pedal, etc.) coupled to one or more actuators by a mechanical linkage (e.g., rods, hydraulic lines, gears, etc.). Control-by-wire systems may be used to replace the mechanical linkages and other components of the conventional control systems. Numerous control-by-wire systems are known in the art. Such systems provide several advantages over the conventional control systems including a reduction of parts and, in many instances, enhanced reliability and performance. As the control-by-wire systems typically lack mechanical linkages, resistance provided to a vehicle driver at the input assembly may also be lacking. Recently, however, numerous strategies have been developed to enhance force feedback of control-by-wire systems thereby providing an authentic controller "feel" to which drivers have become accustomed.

Control-by-wire systems generally operate by receiving driver physical input at the input assembly and producing a corresponding electronic signal proportional to the input. The signal may then be relayed (e.g., via wire, radio-frequency, etc.) to one or more actuators positioned within the vehicle for actuating a given function related to the input. To illustrate, an exemplary steer-by-wire system may include two independent actuators installed adjacent respective front wheels. Each actuator may provide an independent mechanical force to turn its respective front wheel in response to steering wheel movement. The wheels may turn in proportion to the movement of the steering wheel thereby steering the vehicle.

Many conventional control systems allow relatively small positional "adjustments", such as tilting/telescoping of the steering wheel and pedal adjustments to driver height. However, due to the nature of mechanical linkages, the conventional controls may be fixed at a general location within the vehicle. The often complex mechanical linkages may comprise numerous parts, some rigid in nature, making major positional adjustments of the control systems impractical. For example, steering wheels, brake pedals, and accelerator pedals positioned on a vehicle left side, as is convention in North American markets, may not easily be re-positioned to a vehicle right side, as is convention in some European markets. To overcome this, a given vehicle must include two design and manufacturing strategies if it is to be produced for both markets. This may complicate the overall vehicle design and increase manufacturing overhead and cost.

Therefore, it would be desirable to provide re-positionable vehicle control-by-wire assembly, method, and system that overcome the aforementioned and other disadvantages.

SUMMARY OF THE INVENTION

A first aspect of the present invention provides a vehicle control assembly. The assembly includes a controller. A steer-by-wire component, a brake-by-wire component, and an accelerator-by-wire component are each operably attached to the controller. A track is operably attached to the vehicle. The controller is laterally re-positionable with respect to the track.

A second aspect of the invention provides a method for controlling a vehicle. The method includes the steps of providing a controller, and steering, braking, and accelerating the vehicle by-wire with the controller. The method further includes the step of re-positioning the controller between a first vehicle side to a second vehicle side.

A third aspect of the invention provides a system for controlling a vehicle. The system includes controller means, and means for steering, braking, and accelerating the vehicle by-wire with the controller means. The system further includes means for re-positioning the controller means between a first vehicle side to a second vehicle side.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DESCRIPTION OF THE PRESENTLY PREFERRED EMBODIMENTS

Figure 1:
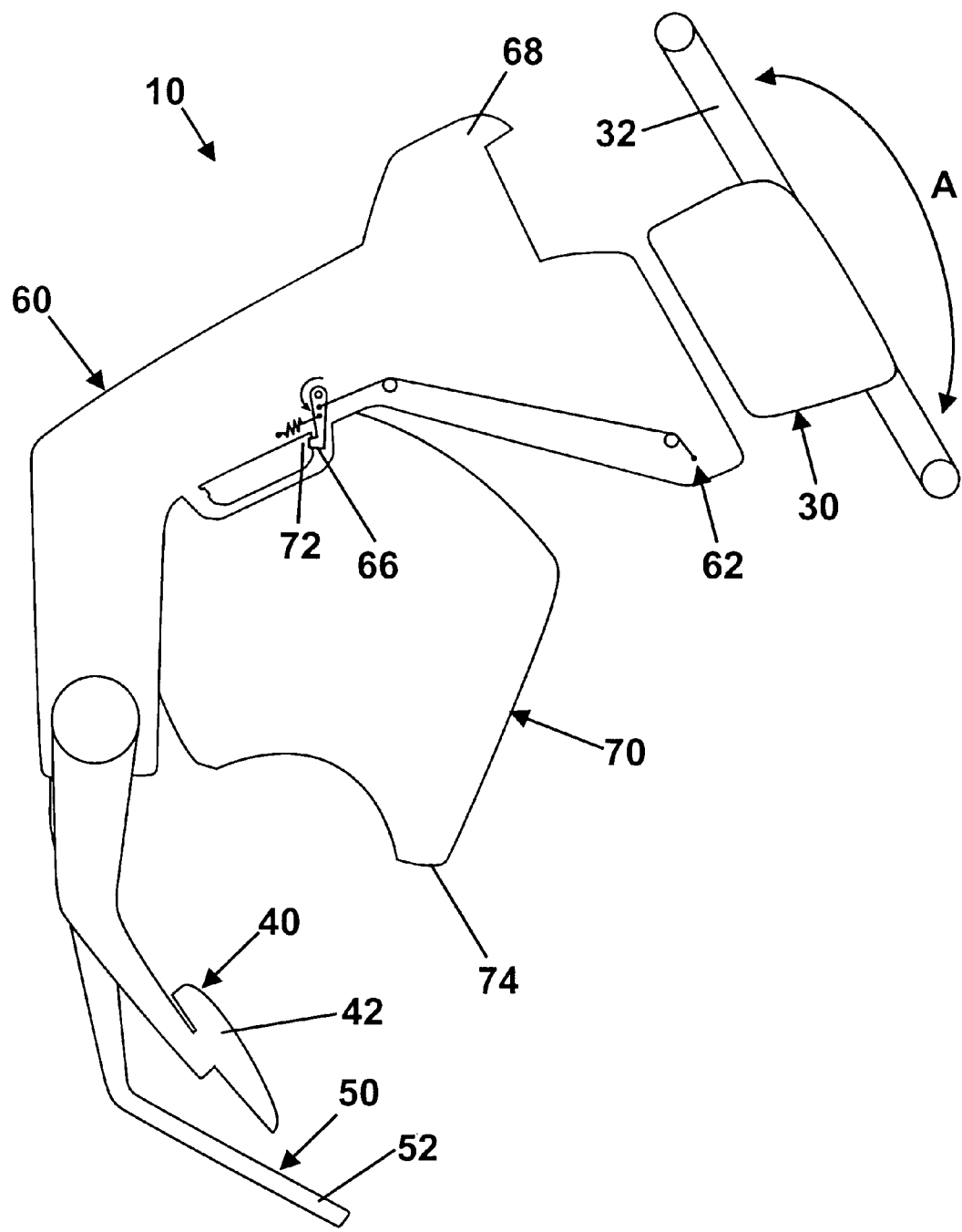
FIG. 1 is a cross-sectional view of a vehicle control assembly in accordance with one embodiment of the present invention.

Referring to the drawings, wherein like reference numerals refer to like elements, FIGS. 1-7 are alternative views of various portions of a vehicle control assembly in accordance with one embodiment of the present invention. The assembly is shown generally by numeral 10. Assembly 10 includes a steer-by-wire component 30, a brake-by-wire component 40, and an accelerator-by-wire component 50, each operably attached to a controller 60. Assembly 10 further includes a track 70 operably attached to a vehicle 90 wherein the controller 60 is laterally re-positionable with respect to the track 70. Those skilled in the art will recognize that the vehicle control assembly may vary and is not limited to the description and illustrations provided herein. As used herein, the term "lateral" when referring to the re-positioning and/or movement of the controller 60 with respect to the track 70 is not limited to a strict linear side-to-side movement but to a generalized sideways movement following an infinite number of paths therebetween (e.g., straight, simple curve or arc, compound curve, etc.).

The disclosed embodiments may be utilized in various types of vehicles employing control-by-wire systems. Preferred embodiments, by way of example, are shown and described herein as an automobile vehicle employing the steer-by-wire 30, brake-by-wire 40, and accelerator-by-wire 50 components. While the preferred embodiments include an automobile control-by-wire system, it will be appreciated by those skilled in the art that the invention is not limited to automobiles alone but may be applied to other vehicles employing electronic control-by-wire systems such as trucks, airplanes, boats, and the like.

Figure 2:
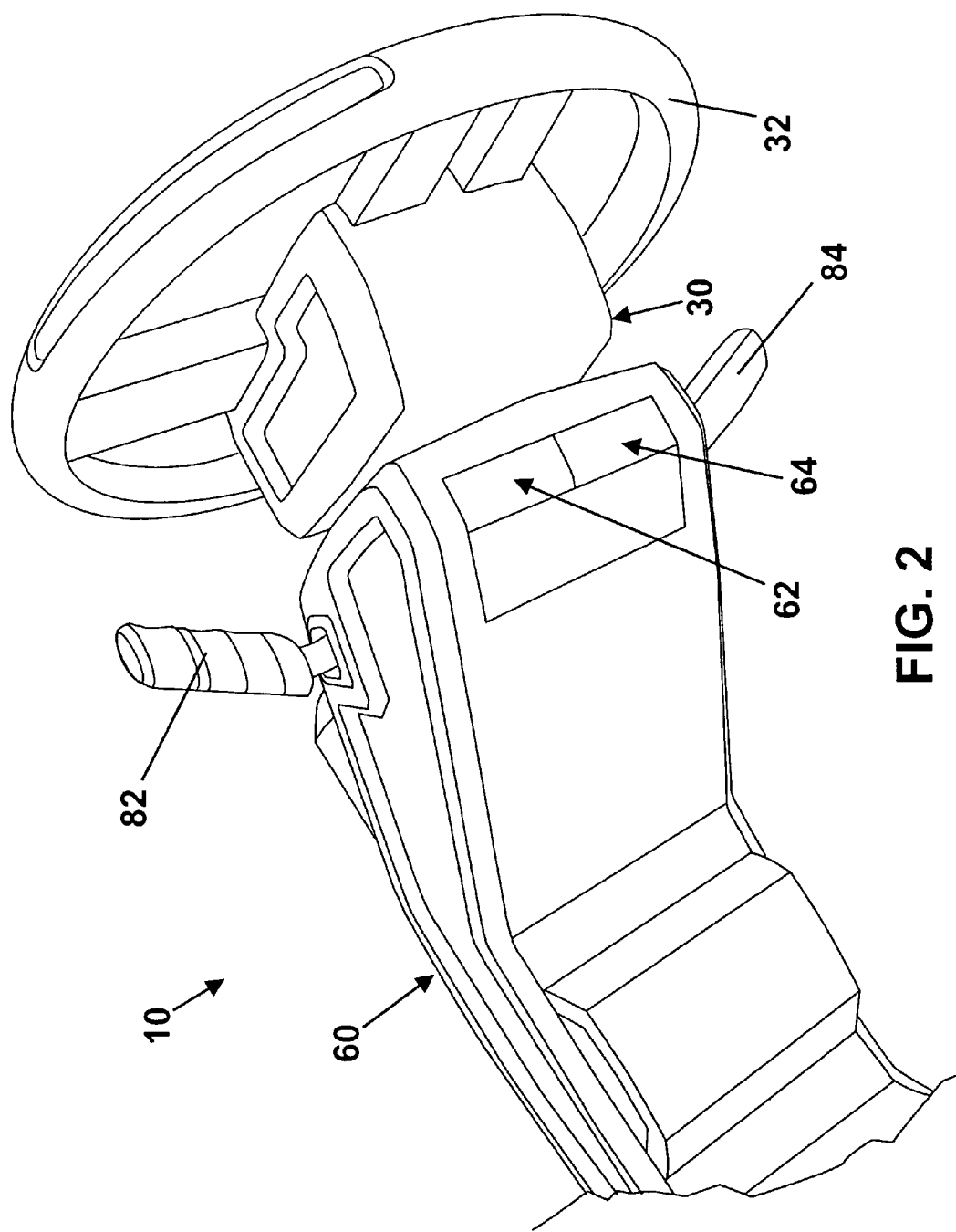
FIGS. 2 and 3 are alternate perspective views of a controller shown in FIG. 1.
Figure 3:
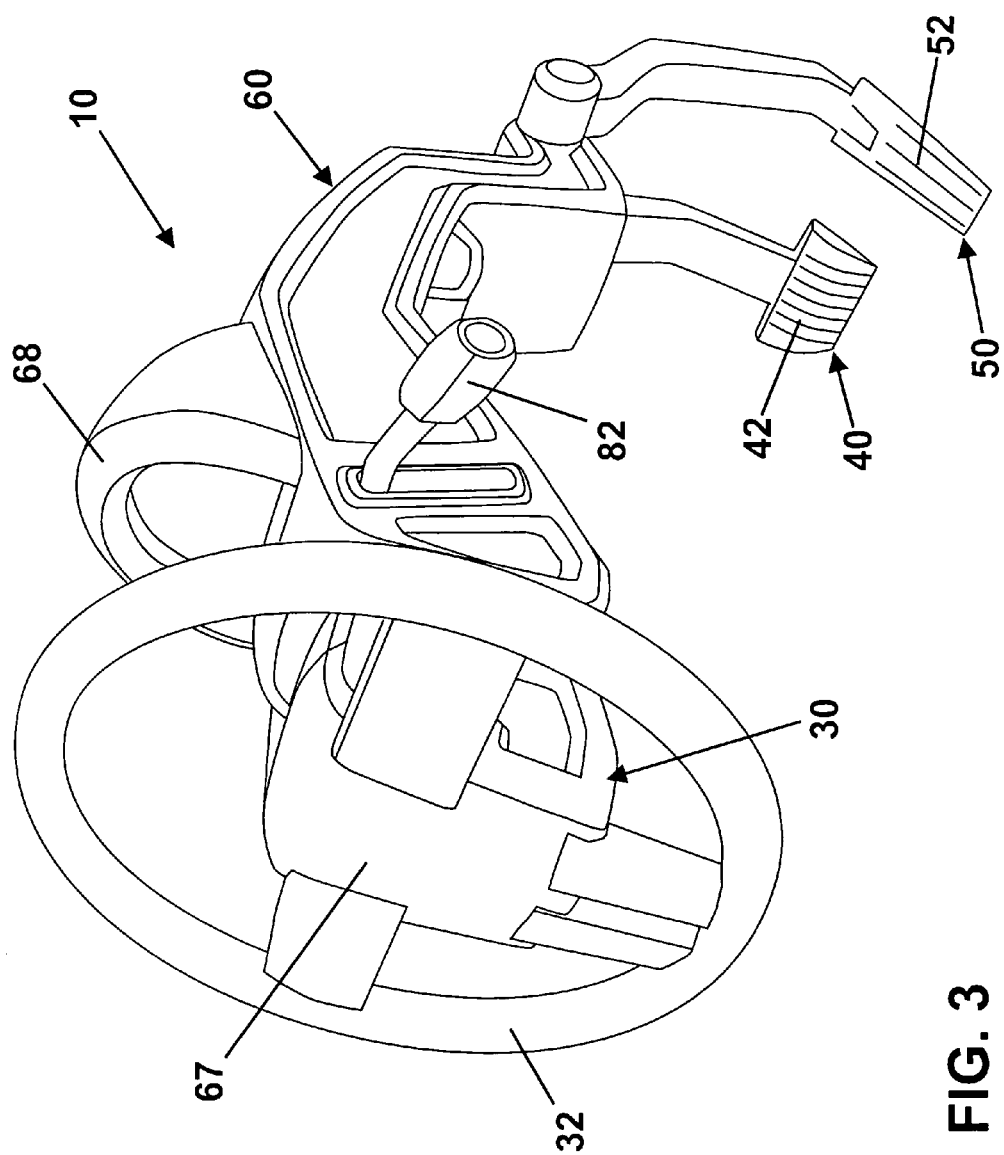

In one embodiment, as shown in FIGS. 1-3, the controller 60 may include an apparatus 62 for releasably locking a steering wheel tilt movement, which is denoted by double arrow A. In the same or another embodiment, the controller 60 may include an apparatus 64 (shown in FIG. 2) for releasably locking lateral controller 60 position. Release apparatuses 62, 64 may comprise manual or electronic buttons, levers, locks, switches, mechanisms, and the like for selectively releasing and locking the controller 60 movements and positions. Controller 60 may include at least one controller element for engaging at least one corresponding track element to substantially prevent lateral movement of the controller 60 wraith respect to the track 70. For example, the track 70 may include a plurality of track teeth 72 (shown also in FIG. 5) that correspond to a controller locking pin 66. In a locked mode (as shown in FIG. 1), the locking pin 66 may engage the teeth 72 to prevent lateral movement of the controller 60 with respect to the track 70. Upon release of the apparatus 64, the locking pin 66 may be biased out of engagement with the teeth 72 thereby allowing lateral re-positioning of the controller 60 with respect to the track 70. During re-positioning, the controller 60 may be moved laterally with respect to the track 70 on a sled-and-track mechanism as is known in the art.

In another embodiment, various strategies may be used releasably lock the controller position including, but not limited to, corresponding gears or locking elements (e.g., a lock-and-key), magnetic elements, and the like. It should be noted that the assembly 10 may operate in a default "locked" mode thereby preventing unwanted movement of the controller 60 during vehicle 90 operations. For example, the release apparatus 64 may only be capable of releasing the controller 60 when the vehicle 90 is stopped, the brake engaged, and the ignition turned off.

Steer-by-wire 30, brake-by-wire 40, and accelerator-by-wire 50 components may each include an input device such as a steering wheel 32, brake pedal 42, and accelerator pedal 52, respectively. Numerous control-by-wire technologies and means for providing force feedback are known in the art and may be adapted for use with the present invention. To illustrate, the steer-by-wire component 30 may comprise several closed loop subsystems that work in conjunction to provide a vehicle operator with control over the vehicle direction while providing appropriate tactile feedback at the steering wheel 32. The steer-by-wire component 30 may utilize rack force signals to generate an equivalent steering wheel torque. The equivalent steering wheel torque value may be compensated for vehicle speed and summed with a speed compensated, position feedback signal and a steering wheel stability correction to generate a steering wheel reference command signal. A servo control loop may be utilized to track the steering wheel reference command signal and maintain its stability. A steering wheel actuator (e.g. an electric motor) responsive to a steering wheel actuator command signal may provide the steering wheel 32 force feedback. As such, the vehicle operator can experience the authentic controller "feel" generated by mechanically linked control systems.

Figure 4:
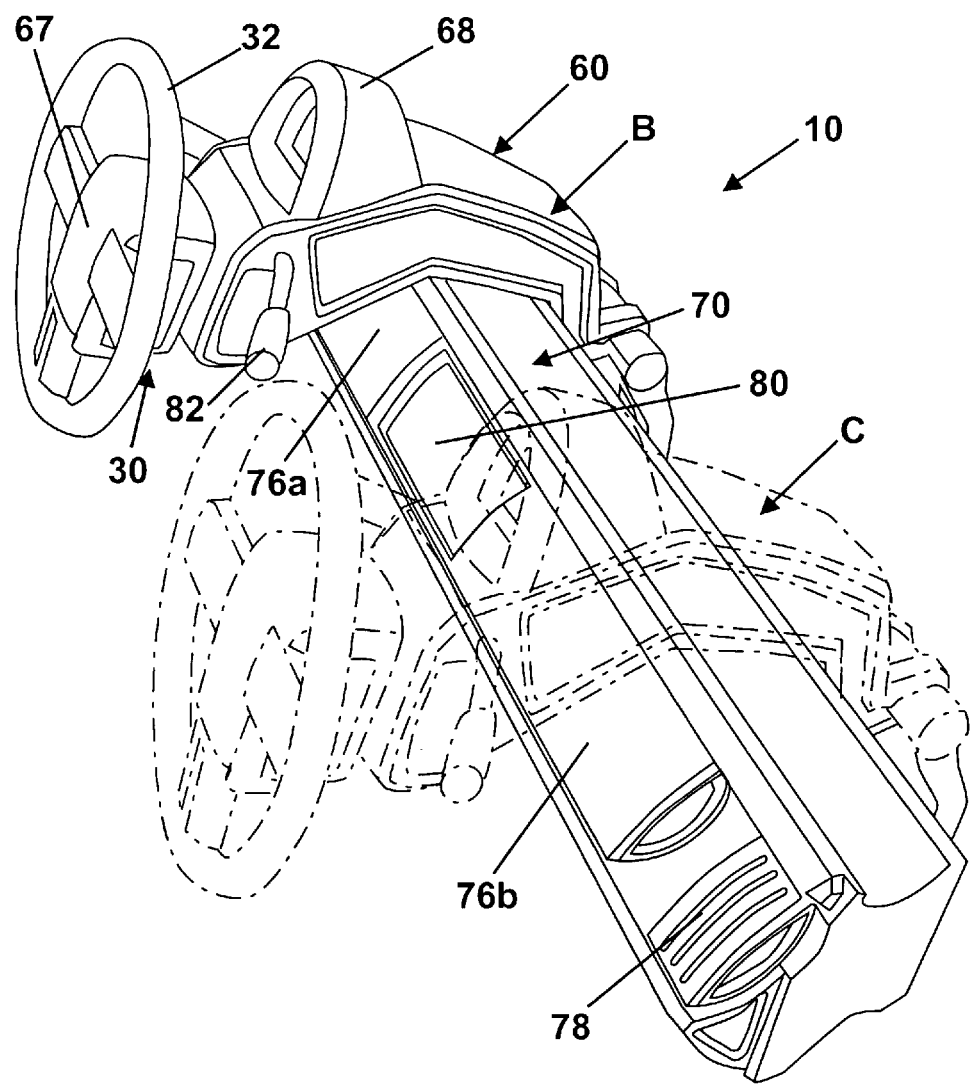
FIG. 4 is a perspective view of the vehicle control assembly shown in FIG. 1 illustrating lateral movement of the controller, in accordance with one embodiment of the present invention.
Figure 5:
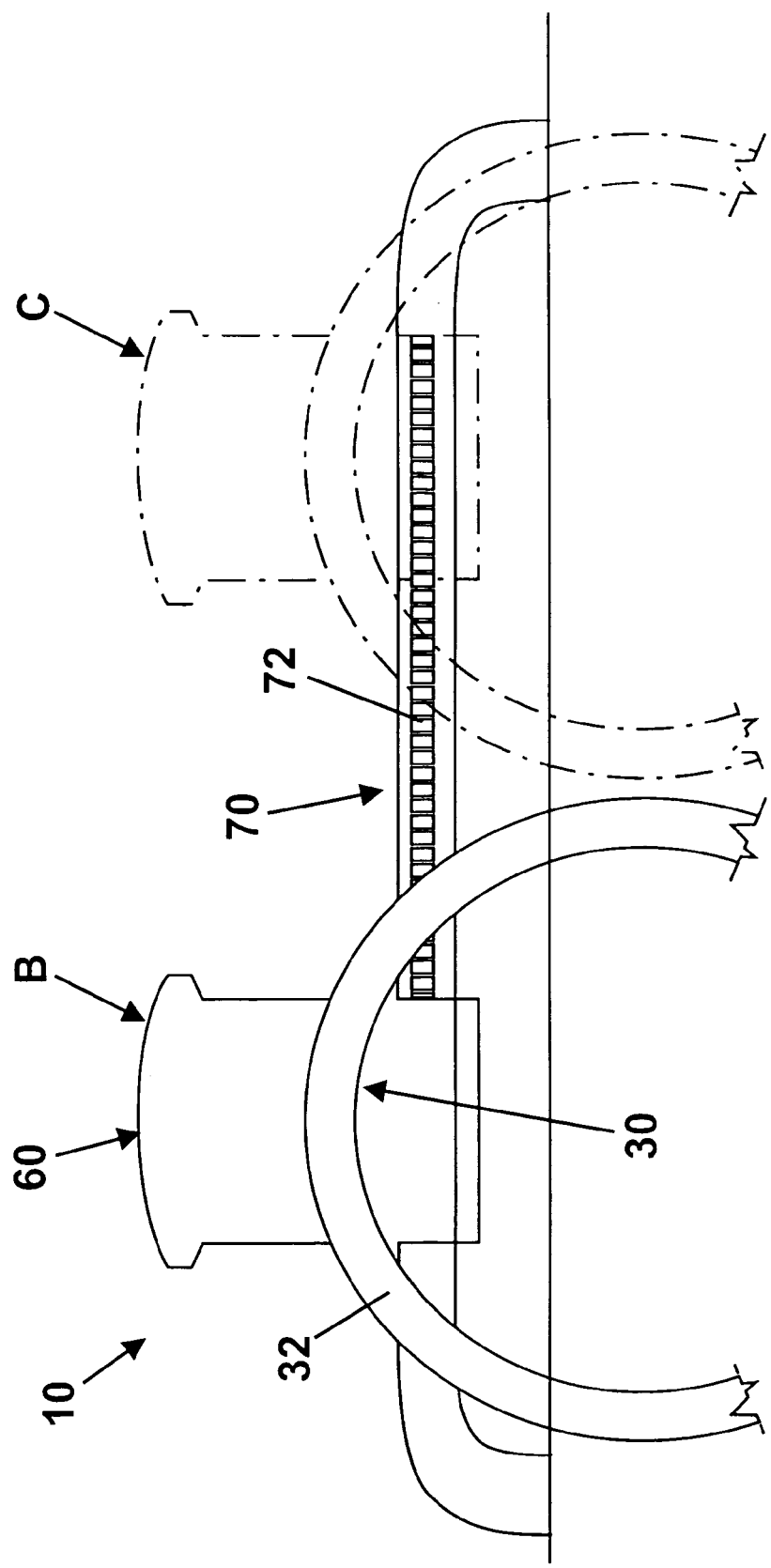
FIG. 5 is a schematic view illustrating the lateral movement of the controller shown in FIG. 4.

As shown in FIGS. 4 and 5, the controller 60 may be laterally re-positionable between a left-hand drive position B and a right-hand drive position C. As such, the steer-by-wire 30, brake-by-wire, and accelerator-by-wire components may be re-positioned between two front seating positions thereby requiring only one design and manufacturing strategy for those vehicles produced in alternate driver-side markets.

Referring again to FIGS. 1-7, the controller 60 may be operably linked to the vehicle 90 by, for example, physical links (e.g., wires, fiber optics, etc.) joined at one or more harnesses, electrical contacts (e.g., between the controller 60 and the track 70), radio-frequency transmission (e.g., between the controller and the vehicle 90), and the like. Accordingly, the controller 60 may be removably attached to the track 70 with relative ease. Controller 60 may be removed entirely from the vehicle 90 to facilitate servicing, cleaning, and other functions. Controller 60 may include various other features such as, for example, means 82 for manually shifting gears of the vehicle and means 84 for initiating turn signal, windshield wipers, windshield fluid, cruise control, and the like.

Figure 7:
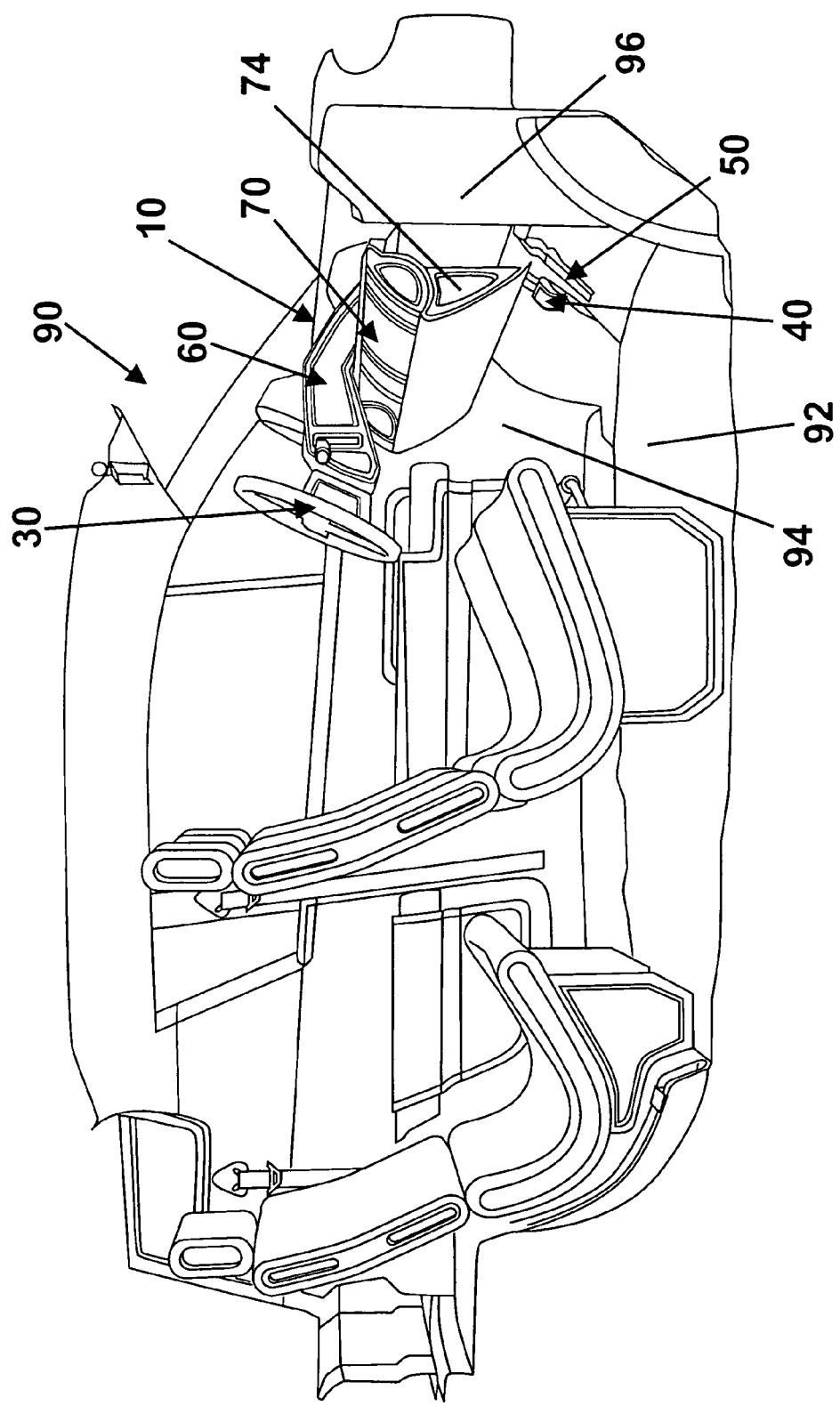

In one embodiment, as shown in FIG. 7, the track 70 may include one or more, in this case one, projection 74 extending substantially toward a vehicle floor portion 92. Such 'knee blockers' are typically found in conventional vehicles to prevent front seat occupants from sliding underneath the steering column during sudden stoppages or impacts. Preferably, the projection 74 may be manufactured from a compliant member (e.g., rubber, plastic, polymer, and the like) to soften potential impact with the occupants. Those skilled in the art will recognize that the number, geometry, and constituent material of the projection 74 may vary from the present description and illustrations.

In one embodiment, as shown in FIG. 4, the controller 60 may include an air bag 67 positioned therein. Air bag 67 may be deactivated in the event the controller 60 is positioned between driving positions within the vehicle 90 (i.e., between the left-hand drive position B and right-hand drive position C) or when the controller 60 is removed from the vehicle 90 altogether. Track 70 may include one or more, in this case two, airbags 76a, 76b generally positioned in front of each front vehicle occupant. When the assembly 10 is positioned over one of the airbags 76a, 76b, that airbag 76a, 76b may be disabled as the controller 50 air bag 67 may instead provide coverage for the driver. Accordingly, each front occupant has the benefit of an airbag. Controller 60 may include one or more, in this case one, indicator assembly 68 for indicating information including vehicle speed, direction, rpm, mileage, trip meter, various indicator warnings, and the like.

In one embodiment, the track 70 may include numerous features for performing various functions. For example, the track 70 may include a ventilation system 78 for providing air flow (e.g., heated or cooled air) to the vehicle occupants. One or more compartments may be formed within the track 70 for providing storage of articles (i.e., a "glove compartment"). Track 70 may include a display system 80 for interface with a vehicle computer, audio system, global positioning system, mapping system, telephony system, and the like.

Figure 6:
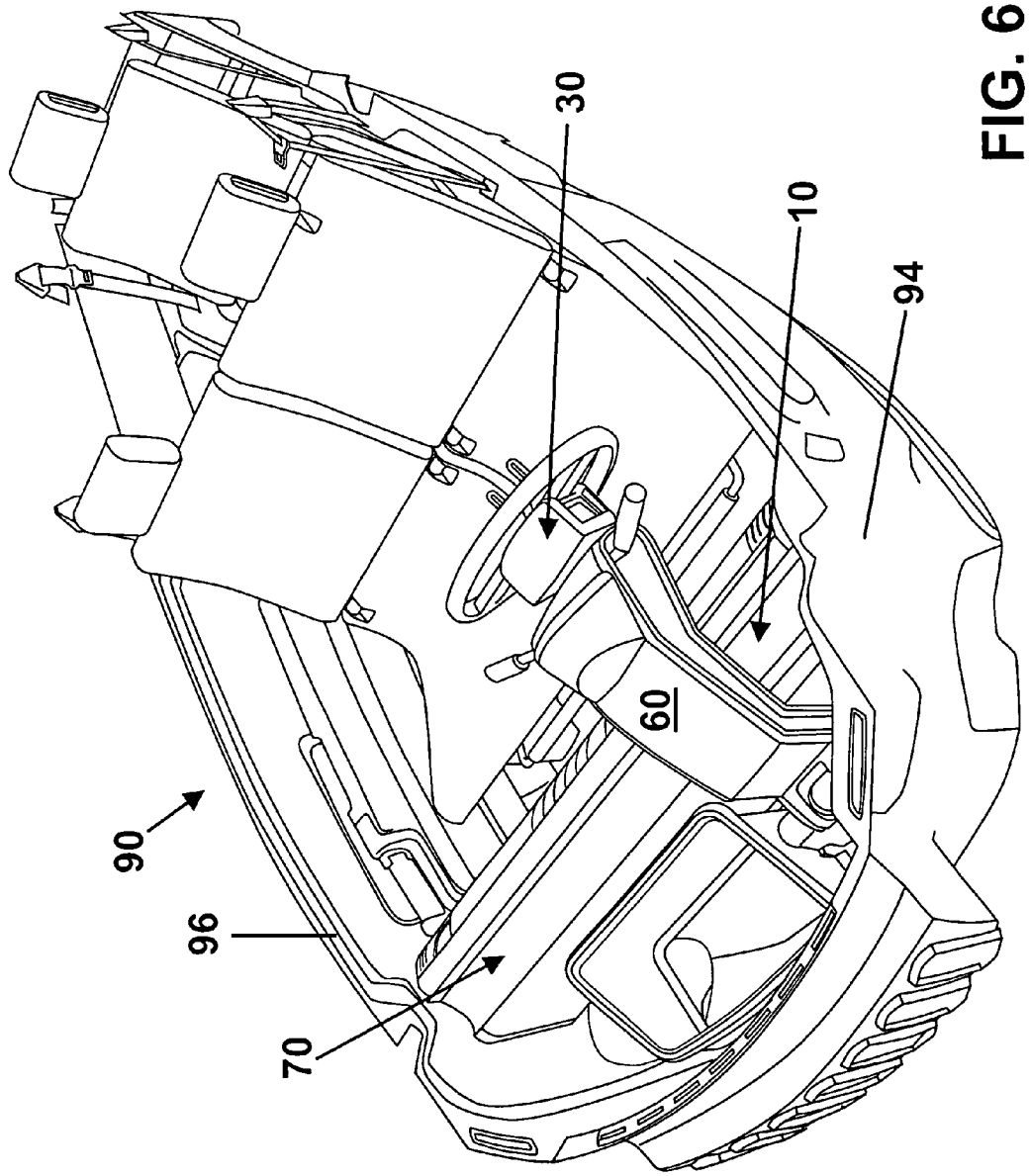
FIGS. 6 and 7 are alternate perspective views of the vehicle control assembly shown in FIG. 1 positioned within a vehicle, in accordance with one embodiment of the present invention.

Referring specifically now to FIGS. 6 and 7, the assembly 10 is shown positioned within a vehicle 90. In one embodiment, the track 70 may extend adjacent a left vehicle side 94 to adjacent right vehicle side 96. Track 70 may provide lateral structural support to the vehicle. For example, the track 70 may be manufactured substantially from a relatively rigid material (e.g., steel, carbon-fiber, aluminum, and the like) thereby strengthening the vehicle in the lateral direction. Although the track 70 is illustrated as a relatively linear member, the geometry may vary to facilitate accommodation into various vehicle cabin designs and/or provide optimal positioning with respect to the vehicle operator. For example, the track may include two curved portions corresponding to and extending toward the front seats thereby positioning the assembly 10 closest when in front of the driver.

While the embodiments of the invention disclosed herein are presently considered to be preferred, various changes and modifications can be made without departing from the spirit and scope of the invention. The positionable vehicle control-by-wire assembly, method, and system are not limited to any particular design or arrangement. For example, the controller, track, release apparatuses, indicators, vehicle, and the materials thereof may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

The invention claimed is:

1. A vehicle control assembly comprising:
   a controller;
   a steer-by-wire component that includes a hand-operated steering wheel and that is operably attached to the controller;
   a brake-by-wire component that includes a foot-operated brake pedal and that is operably attached to the controller;
   an accelerator-by-wire component that includes a foot-operated accelerator pedal and that is operably attached to the controller; and
   a track operably attached to the vehicle wherein the controller along with its hand and foot operated components is laterally re-positionable with respect to the track.

2. The assembly of claim 1 wherein the controller comprises at least one projection extending substantially toward a vehicle floor portion.

3. The assembly of claim 1 wherein the controller comprises an apparatus for releasably locking controller tilt position.

4. The assembly of claim 1 wherein the controller comprises an apparatus for releasably locking lateral controller position.

5. The assembly of claim 1 wherein the controller is laterally re-positionable between a left vehicle side and a right vehicle side.

6. The assembly of claim 1 wherein the track extends from adjacent a first vehicle side to adjacent a second vehicle side.

7. The assembly of claim 6 wherein the track provides lateral structural support to the vehicle.

8. The assembly of claim 1 wherein the controller comprises at least one controller element for engaging at least one corresponding track element to substantially prevent lateral movement of the controller with respect to the track.

9. The assembly of claim 1 wherein the controller is removably attached to the track.

10. The assembly of claim 1 further comprising an air bag component operably attached to the controller.

11. The assembly of claim 1 further comprising at least one vehicle indicator operably attached to the controller.

12. A method of controlling a vehicle, the method comprising:
    providing a controller;
    steering the vehicle by-wire with the controller based on an input from a hand-operated steering wheel;
    braking the vehicle by-wire with the controller based on an input from a foot-operated brake pedal;
    accelerating the vehicle by-wire with the controller based on an input from a foot-operated accelerator pedal; and
    re-positioning the controller along with its hand and foot operated components between a first vehicle side to a second vehicle side.

13. The method of claim 12 further comprising providing at least one projection extending substantially toward a vehicle floor portion.

14. The method of claim 12 further comprising releasably locking a controller tilt movement.

15. The method of claim 12 wherein reversibly positioning the controller comprises releasably locking the controller position.

16. The method of claim 12 further comprising providing lateral structural support to the vehicle.

17. The method of claim 12 further comprising removably attaching the controller to the vehicle.

18. The method of claim 12 further comprising reversibly positioning an air bag component from the first vehicle side to the second vehicle side.

19. The method of claim 12 further comprising indicating at least one vehicle status with the controller.

20. A vehicle control assembly comprising:
    a controller;
    a steer-by-wire component that includes a hand-operated steering wheel and that is operably attached to the controller;
    a brake-by-wire component that includes a foot-operated brake pedal and that is operably attached to the controller;
    an accelerator-by-wire component that includes a foot-operated accelerator pedal and that is operably attached to the controller; and
    a track operably attached to the vehicle wherein the controller along with its hand and foot operated components is removably attached to the track and laterally re-positionable with respect to the track between a left vehicle side and a right vehicle side.

* * * * *